US008885290B1

(12) United States Patent
Gustafson et al.

(10) Patent No.: US 8,885,290 B1
(45) Date of Patent: Nov. 11, 2014

(54) DISK DRIVE WITH REMOVABLY EXTERNALLY FIXED CANISTER UNDER A HERMETIC SEAL

(71) Applicant: Western Digital Technologies, Inc., Irvine, CA (US)

(72) Inventors: John R. Gustafson, Los Gatos, CA (US); Jon E. Jacoby, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/786,374

(22) Filed: Mar. 5, 2013

(51) Int. Cl.
*G11B 33/14* (2006.01)

(52) U.S. Cl.
CPC .................................. *G11B 33/1466* (2013.01)
USPC ....................................................... 360/97.16

(58) Field of Classification Search
USPC .................................. 360/97.16, 97.18, 99.12
See application file for complete search history.

(56) References Cited

U.S. PATENT DOCUMENTS

| 4,642,715 | A | 2/1987 | Ende |
| 4,831,475 | A | 5/1989 | Kakuda et al. |
| 5,075,807 | A | 12/1991 | Inoue et al. |
| 6,128,159 | A * | 10/2000 | Ino .............................. 360/97.16 |
| 6,940,687 | B2 * | 9/2005 | Hong et al. ................ 360/97.16 |
| 7,082,012 | B2 * | 7/2006 | Macpherson et al. ..... 360/97.18 |
| 7,291,208 | B2 * | 11/2007 | Dauber et al. .................. 96/134 |
| 7,686,871 | B2 * | 3/2010 | Oh et al. ......................... 96/134 |
| 8,254,056 | B2 * | 8/2012 | Ichikawa et al. ........... 360/97.18 |
| 2003/0142438 | A1 * | 7/2003 | Brown et al. .............. 360/97.02 |
| 2005/0036232 | A1 * | 2/2005 | Macpherson .............. 360/97.02 |
| 2005/0063093 | A1 * | 3/2005 | Hong et al. ................ 360/97.02 |
| 2009/0116141 | A1 | 5/2009 | Brown |
| 2011/0109989 | A1 * | 5/2011 | Turner et al. .............. 360/97.02 |
| 2012/0275053 | A1 * | 11/2012 | McGuire, Jr. ............. 360/97.16 |
| 2013/0044391 | A1 * | 2/2013 | Brown ....................... 360/97.16 |
| 2013/0044392 | A1 * | 2/2013 | Brown ....................... 360/97.16 |
| 2013/0148239 | A1 * | 6/2013 | Lee ............................ 360/97.18 |

* cited by examiner

*Primary Examiner* — Allen T Cao

(57) ABSTRACT

A disk drive includes a disk drive enclosure having a canister opening, and a disk rotably mounted to and within the disk drive enclosure. A canister containing a desiccant or adsorptive material is removably externally fixed within the canister opening. An external surface of the canister is external to and facing away from the enclosure. A hermetic seal covers the external surface of the canister and is externally adhered to the disk drive enclosure.

18 Claims, 5 Drawing Sheets

DISK DRIVE WITH REMOVABLY EXTERNALLY FIXED CANISTER UNDER A HERMETIC SEAL

BACKGROUND

Information storage devices are used to retrieve and/or store data in computers and other consumer electronics devices. A magnetic hard disk drive is an example of an information storage device that includes one or more heads that can both read and write to a spinning disk media, but other information storage devices also include heads—sometimes including heads that cannot write.

Disk drive reliability can be enhanced by control of humidity and/or contaminants within the disk drive enclosure, which may otherwise adversely affect the head/disk interface. For example, disk drives have been manufactured with internal desiccant materials and/or adsorptive materials within, to reduce the migration of excessive lubricant, contamination, and/or moisture to the head/disk interface. However, if a desiccant material is installed too long before finally sealing the disk drive enclosure during manufacture, then the desiccant material can be degraded by humidity in the manufacturing environment (e.g. clean room moisture uptake by the desiccant). Hence there is a need in the art for a means to introduce a desiccant or adsorptive material into a disk drive quickly and late in the manufacturing process.

Some disk drives are hermetically sealed, for example so that an alternative gas (e.g. helium) can be retained within the disk drive. However, a sealed disk drive may have a high internal relative pressure (relative to the external barometric pressure), which could undesirably blister a cover seal if a large enough area hole were underneath. Hence, there is a need in the art for a means to introduce a desiccant or adsorptive material into a disk drive quickly and late in the manufacturing process of a hermetically sealed disk drive, with reduced or avoided blistering of a cover seal.

DETAILED DESCRIPTION OF EXEMPLARY EMBODIMENTS

Figure 1:
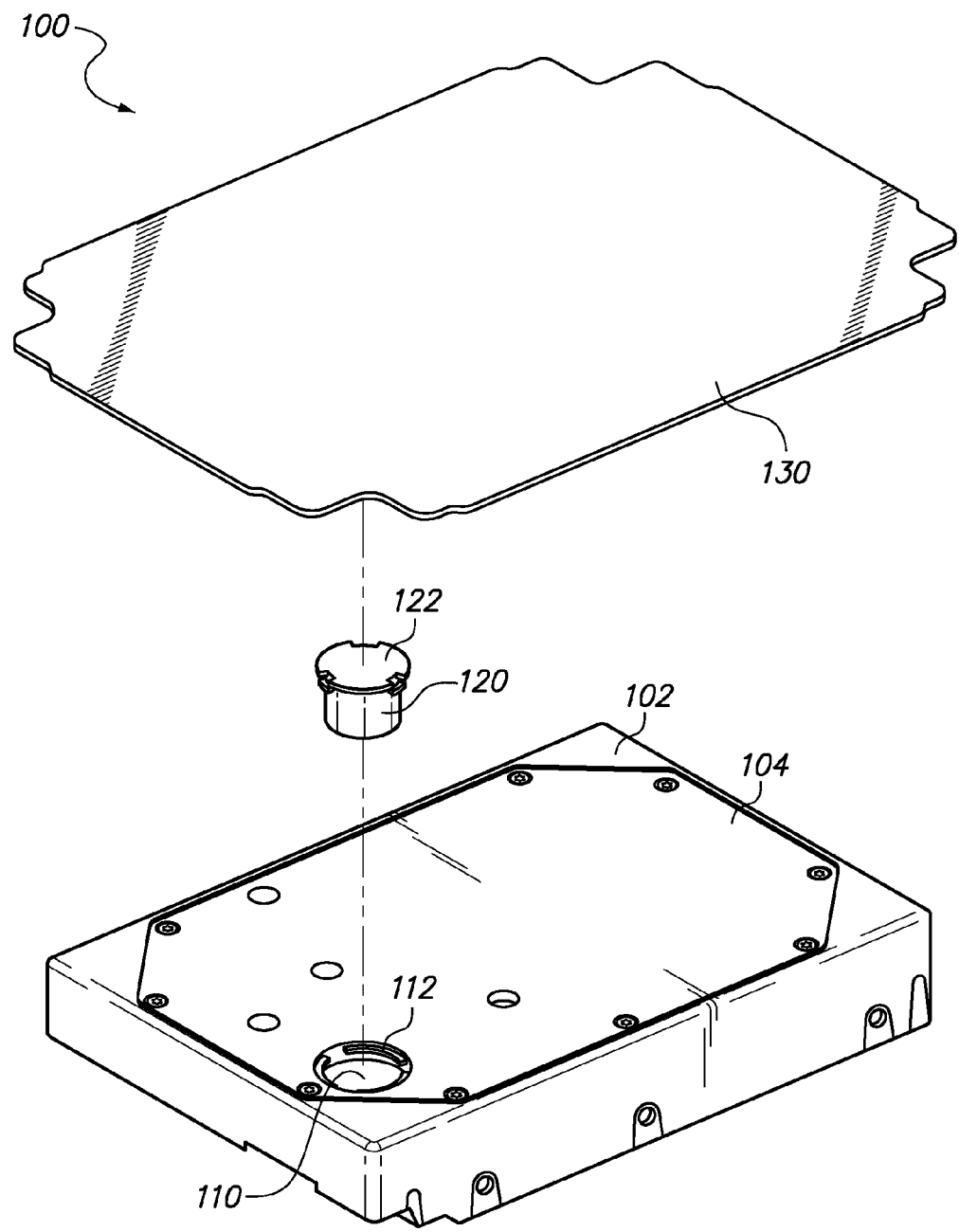
FIG. 1 is top perspective exploded view of a disk drive according to an embodiment of the present invention.
Figure 2:
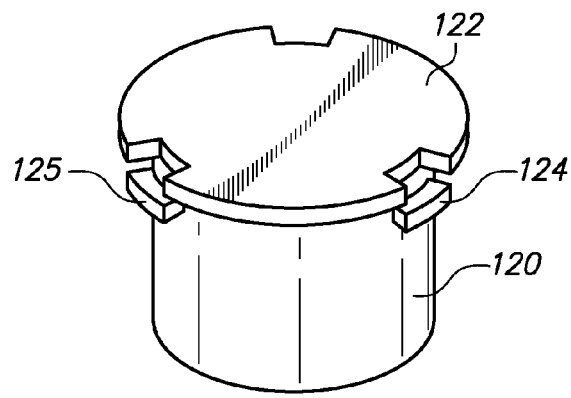
FIG. 2 is a top perspective view of a canister according to an embodiment of the present invention.
Figure 3:
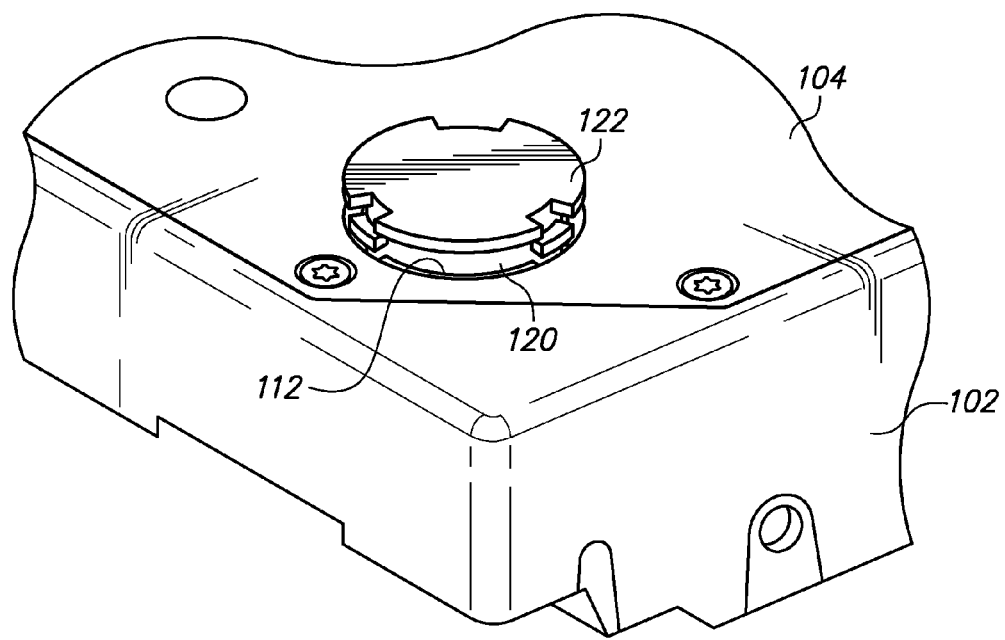
FIG. 3 is a top perspective view of a disk drive according to an embodiment of the present invention, with canister partially inserted.
Figure 4:
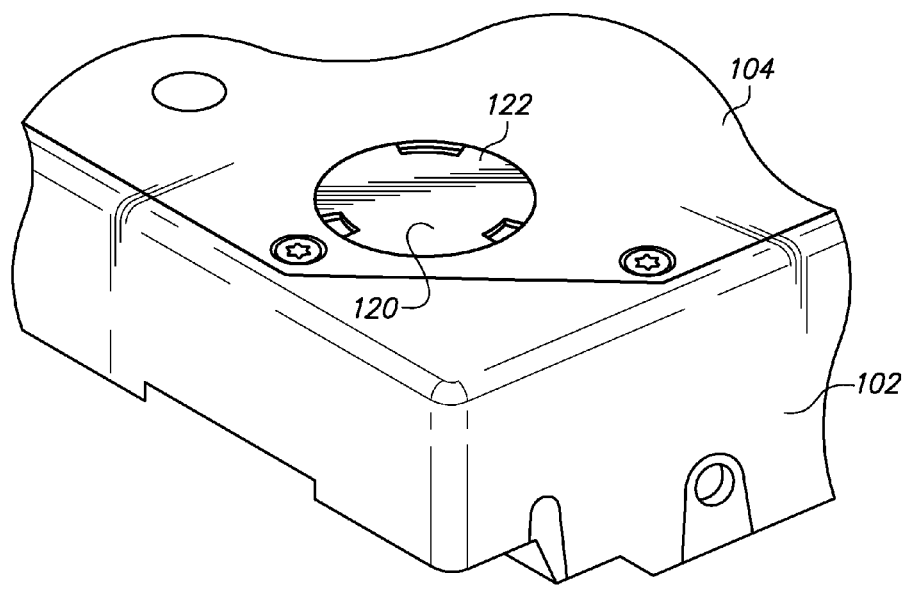
FIG. 4 is a top perspective view of a disk drive according to an embodiment of the present invention, with canister fully inserted and fixed but with cover seal not yet applied.

FIG. 1 is top perspective exploded view of a disk drive 100 according to an embodiment of the present invention. FIG. 2 is a top perspective view of a canister 120 according to an embodiment of the present invention. FIG. 3 is a top perspective view of the disk drive 100, with the canister 120 partially inserted. FIG. 4 is a top perspective view of the disk drive 100, with the canister 120 fully inserted and fixed in place, but with a cover seal not yet applied.

Now referring to the embodiment of FIGS. 1-4, the disk drive 100 includes a disk drive base 102 and a disk drive cover 104, that together form a disk drive enclosure. A conventional disk is rotably mounted to the disk drive base 102 within the disk drive enclosure, but the conventional disk and other internal disk drive components cannot be seen in the views of FIGS. 1, 3, and 4, because they are obscured by the disk drive enclosure itself.

In the embodiment of FIGS. 1-4, the cover 104 of the disk drive enclosure includes a canister opening 110. The disk drive 100 includes a canister 120 containing a desiccant material and/or an adsorptive material. The canister 120 is removably externally fixed within the canister opening 110. In this context, the canister 120 is said to be "removably externally fixed within the canister opening" if it is structured (1) to fit within the canister opening 110 from the outside of the disk drive enclosure, and (2) to be fixed to the disk drive enclosure after insertion, so that it can withstand an outward force that would otherwise translate it back out of the canister opening 110, and (3) to be optionally removable without destruction of the canister 120, after being fixed to the disk drive enclosure.

Specifically, in the embodiment of FIGS. 1-4, the canister 120 has a generally round cylindrical shape and is removably externally fixed within the canister opening 110 in the cover 104 of the enclosure of disk drive 100 by bayonet tabs 124, 125 that protrude radially from the canister 120 and engage with engaging features (e.g. engaging feature 112) of the canister opening 110. In the embodiment of FIGS. 1-4, such engagement is accomplished by twisting the canister 120 into the canister opening 110 until the canister 120 locks in place. An external surface 122 of the canister 120 remains external to and facing away from the disk drive enclosure even after the canister 120 is inserted into and fixed within the canister opening 120.

In the embodiment of FIG. 1, a hermetic seal 130 covers the external surface 122 of the canister 120, and is externally adhered to the cover 104 of the disk drive enclosure. In the embodiment of FIG. 1, the hermetic seal 130 optionally is a disk drive cover seal that is also adhered to the external surface 122 of the canister 120, and may optionally also be adhered to an external surface of the disk drive base 102. In certain embodiments, the hermetic seal 130 preferably includes a metal foil laminated with an adhesive layer.

In the embodiment of FIGS. 1-4, the canister 120 may house an adsorptive material such as silica gel, for example, or various other adsorbant materials such as activated carbon, zeolites, activated alumina, sodium carbonate, calcium carbonate, potassium carbonate, calcium hydroxide, calcium sulfate, and/or a powdered metal. Alternatively or in addition, the canister 120 may house a desiccant material such as silica gel, activated carbon, calcium sulfate, calcium chloride, and/or montmorillonite clay.

Figure 5:
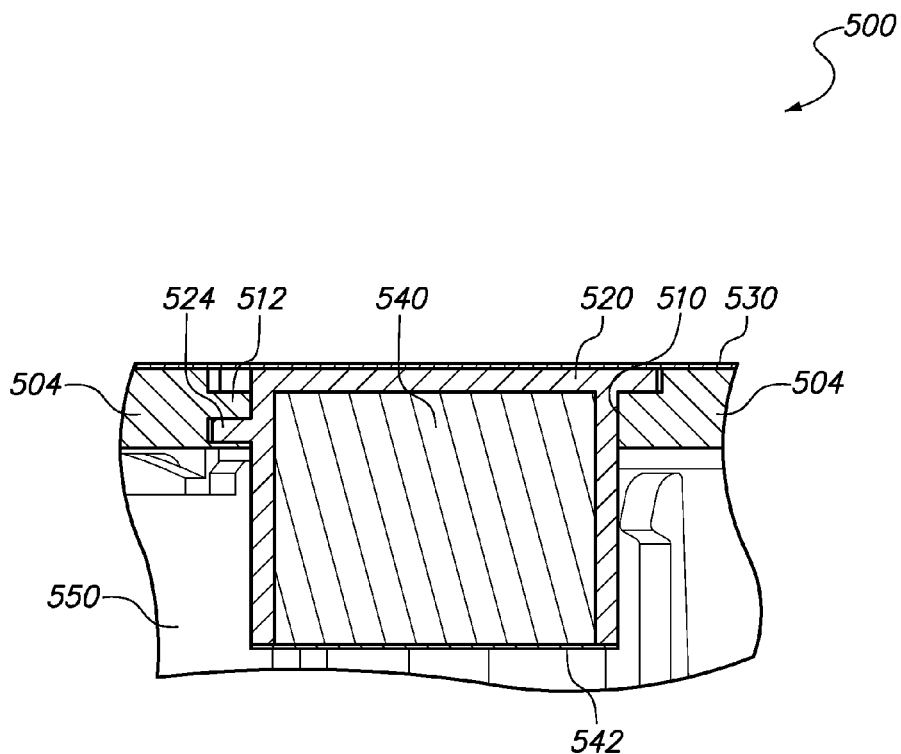
FIG. 5 is a cross-sectional view of a portion of a disk drive according to an embodiment of the present invention.

FIG. 5 is a cross-sectional view of a portion of a disk drive 500 according to an embodiment of the present invention. The disk drive 500 includes a disk drive enclosure 504 that has a canister opening 510. The disk drive 500 includes a canister 520 (e.g. a canister formed from a hard plastic material) containing a desiccant material and/or an adsorptive material 540. The canister 520 is removably externally fixed within the canister opening 510 by at least one bayonet tab 524 that protrudes radially from the canister 520, to engage with an engaging feature 512 of the canister opening 510 of the disk drive enclosure 504.

In the embodiment of FIG. 5, a hermetic seal 530 covers an external surface of the canister 520, and is externally adhered to the disk drive enclosure 504. In the embodiment of FIG. 5, the hermetic seal 530 optionally is also adhered to the external surface of the canister 520, and may preferably include a metal foil laminated with an adhesive layer. Such adherence to the external surface of the canister 520, together with the engagement of the bayonet tab 524 with the engaging feature 512, can reduce blistering of hermetic seal 530 even when a gas pressure within the disk drive enclosure 504 is greater than the barometric pressure outside of the disk drive enclosure 504.

In the embodiment of FIG. 5, the canister 520 includes a gas-permeable membrane 542 that faces into an internal space 550 of the disk drive enclosure 504, and is positioned to block the desiccant and/or adsorptive material 540 from spreading from the canister 520 into the internal space 550 of the disk drive enclosure 504. The gas-permeable membrane 542 may comprise a fabric or a paper that is optionally adhered to a hard plastic material of the canister 520. For example, a polytetrafluoroethylene (PTFE) filter fabric may be used as the gas-permeable membrane 542.

Figure 6:
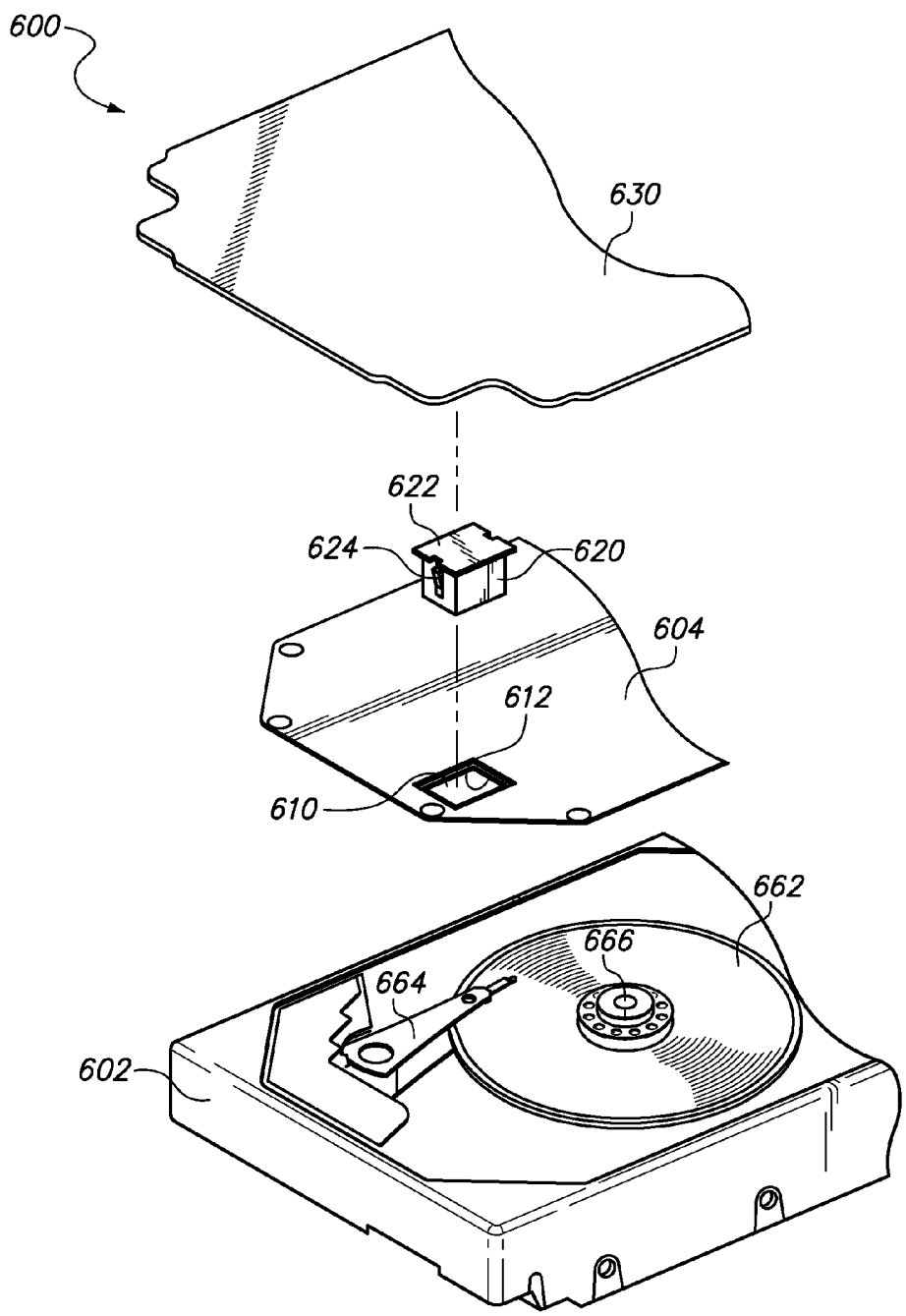
FIG. 6 is top perspective exploded view of a disk drive according to an embodiment of the present invention.

FIG. 6 is top perspective exploded view of a disk drive 600 according to an embodiment of the present invention. The disk drive 600 includes a disk drive base 602 and a disk drive cover 604 that together comprise a disk drive enclosure. The disk drive 600 further includes a spindle 666, rotatably mounted on the disk drive base 602, for rotating at least one disk 662 that is mounted on the spindle 666. In certain embodiments, disk drive 600 may have only a single disk 662, or alternatively, two or more disks. The disk drive 600 also includes a head stack assembly 664 pivotably mounted to the disk drive base 602 for positioning one or more read or write heads over a respective surface of the disk 662.

In the embodiment of FIG. 6, the disk drive cover 604 includes a canister opening 610, although in an alternative embodiment the canister opening may instead be disposed in the disk drive base 602. The disk drive 600 includes a canister 620 (e.g. a canister formed from a hard plastic material) containing a desiccant material and/or an adsorptive material. In the embodiment of FIG. 6, the canister 620 is removably externally fixed within the canister opening 610 by at least one resilient snap-in latching tab 624 that protrudes from the canister 620 and engages with a lip 612 of the canister opening 610 of the disk drive cover 604.

In the embodiment of FIG. 6, a hermetic seal 630 covers an external surface 622 of the canister 620, and is externally adhered to the disk drive base 602 and the disk drive cover 604. In the embodiment of FIG. 6, the hermetic seal 630 optionally is also adhered to the external surface 622 of the canister 620, and may preferably include a metal foil laminated with an adhesive layer. Such adherence to the external surface 622 of the canister 620, together with the engagement of the resilient snap-in latching tab 624 with the lip 612 of the canister opening 610 of the disk drive cover 604, can reduce blistering of hermetic seal 630 even when a gas pressure within the disk drive enclosure is greater than the barometric pressure outside of the disk drive enclosure.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
a disk drive enclosure having a canister opening;
a disk rotably mounted to and within the disk drive enclosure;
a canister containing a desiccant material removably externally fixed within the canister opening, an external surface of the canister being external to and facing away from the enclosure; and
a hermetic seal covering the external surface of the canister and being externally adhered to the disk drive enclosure.

2. The disk drive of claim 1 wherein the hermetic seal is also adhered to the external surface of the canister.

3. The disk drive of claim 1 wherein desiccant material comprises a material selected from the group consisting of silica gel, activated carbon, calcium sulfate, calcium chloride, and montmorillonite clay.

4. The disk drive of claim 1 wherein the canister has a generally round cylindrical shape, and wherein the canister is removably externally locked to the canister opening by a plurality of bayonet tabs that protrude radially from the canister and engage with the disk drive enclosure.

5. The disk drive of claim 1 wherein the canister comprises a hard plastic material.

6. The disk drive of claim 1 wherein the hermetic seal comprises a metal foil laminated with an adhesive layer.

7. The disk drive of claim 6 wherein the hermetic seal is a disk drive cover seal.

8. A disk drive comprising:
a disk drive enclosure having a canister opening;
a disk rotably mounted to and within the disk drive enclosure;
a canister containing a desiccant material removably externally fixed within the canister opening, an external surface of the canister being external to and facing away from the enclosure; and
a hermetic seal covering the external surface of the canister and being externally adhered to the disk drive enclosure;
wherein the canister is removably externally locked to the canister opening by at least one resilient snap-in latching tab that protrudes from the canister and engages with the disk drive enclosure.

9. A disk drive comprising:
a disk drive enclosure having a canister opening;
a disk rotably mounted to and within the disk drive enclosure;
a canister containing a desiccant material removably externally fixed within the canister opening, an external surface of the canister being external to and facing away from the enclosure; and
a hermetic seal covering the external surface of the canister and being externally adhered to the disk drive enclosure;
wherein the canister includes a gas-permeable membrane that faces into the disk drive enclosure and is positioned to block the desiccant material from spreading from the canister into the disk drive enclosure.

10. A disk drive comprising:
a disk drive enclosure having a canister opening;
a disk rotably mounted to and within the disk drive enclosure;
a canister containing an adsorptive material removably externally fixed within the canister opening, an external surface of the canister being external to and facing away from the enclosure; and
a hermetic seal covering the external surface of the canister and being externally adhered to the disk drive enclosure.

11. The disk drive of claim 10 wherein the hermetic seal is also adhered to the external surface of the canister.

12. The disk drive of claim 10 wherein adsorptive material comprises a material selected from the group consisting of silica gel, powdered metal, activated carbon, zeolites, activated alumina, sodium carbonate, calcium carbonate, potassium carbonate, calcium hydroxide, and calcium sulfate.

13. The disk drive of claim 10 wherein the canister has a generally round cylindrical shape, and wherein the canister is removably externally locked to the canister opening by a plurality of bayonet tabs that protrude radially from the canister and engage with the disk drive enclosure.

14. The disk drive of claim 10 wherein the canister comprises a hard plastic material.

15. The disk drive of claim 10 wherein the hermetic seal comprises a metal foil laminated with an adhesive layer.

16. The disk drive of claim 15 wherein the hermetic seal is a disk drive cover seal.

17. A disk drive comprising:

a disk drive enclosure having a canister opening;

a disk rotably mounted to and within the disk drive enclosure;

a canister containing an adsorptive material removably externally fixed within the canister opening, an external surface of the canister being external to and facing away from the enclosure; and a hermetic seal covering the external surface of the canister and being externally adhered to the disk drive enclosure;

wherein the canister is removably externally locked to the canister opening by at least one resilient snap-in latching tab that protrudes from the canister and engages with the disk drive enclosure.

18. A disk drive comprising:

a disk drive enclosure having a canister opening;

a disk rotably mounted to and within the disk drive enclosure;

a canister containing an adsorptive material removably externally fixed within the canister opening, an external surface of the canister being external to and facing away from the enclosure; and a hermetic seal covering the external surface of the canister and being externally adhered to the disk drive enclosure;

wherein the canister includes a gas-permeable membrane that faces into the disk drive enclosure and is positioned to block the adsorptive material from spreading from the canister into the disk drive enclosure.

* * * * *